United States Patent [19]
Hirose

[11] Patent Number: 5,749,319
[45] Date of Patent: May 12, 1998

[54] PEARL AND METHOD FOR PRODUCING SAME

[76] Inventor: Tokuzo Hirose, 13-13, Higashiyama-cho, Ashiya-shi, Hyogo, Japan

[21] Appl. No.: 721,120

[22] Filed: Sep. 26, 1996

[30] Foreign Application Priority Data

Jul. 1, 1996 [JP] Japan .................. 8-171459

[51] Int. Cl.$^6$ .................................. A01K 61/00
[52] U.S. Cl. .................................. 119/244
[58] Field of Search .................................. 119/244

[56] References Cited

U.S. PATENT DOCUMENTS

| | | | |
|---|---|---|---|
| 1,176,090 | 3/1916 | Nishikawa | 119/244 |
| 1,328,008 | 1/1920 | Mikimoto | 119/244 |
| 1,353,932 | 9/1920 | Mise | 119/244 |
| 1,847,128 | 3/1932 | Mikimoto | 119/244 |
| 2,126,024 | 8/1938 | Mikimoto | 119/244 |
| 3,113,554 | 12/1963 | Kanai | 119/244 |

*Primary Examiner*—Cary E. O'Connor
*Assistant Examiner*—Yvonne R. Abbott
*Attorney, Agent, or Firm*—Iandiorio & Teska

[57] ABSTRACT

The invention provides a method for producing a sufficiently large pearl in a short time without requiring a skilled person. Genes of mantle cells of a shellfish for forming a pearl layer are incorporated into genes of monads or ultramicro organisms that generate a viscous secretion, by which pearl generating organisms are prepared. By these pearl generating organisms, pearl constituents are formed from calcium ions or magnesium ions in seawater and carbonate ions. By the viscous secretion, the pearl constituents are made to adhere to and stack onto the outer peripheral surface of a core composed of a synthetic resin, shell, ceramic, wood, or metal, so that a pearl layer is formed up.

4 Claims, No Drawings

5,749,319

PEARL AND METHOD FOR PRODUCING SAME

BACKGROUND OF THE INVENTION

1. Field of the Invention

The present invention relates to a pearl utilizing microorganisms or ultramicro organisms and a method for producing the same.

2. Description of the Related Art

Pearls are formed from secretory substances of mantles of bivalves, such as pearl oyster and *Hyriopsis (Sinohyriopsis) schlegelii*, which is called "ikecho-gai" (a kind of bivalve special to Lake Biwa, Japan) in Japan, which are formed on outer peripheral surfaces of cores of synthetic resin or shell chips. Generally, shellfish (bivalves and snails) grows by secreting shell-forming constituents from the mantle. When hard foreign matters have entered between shell and mantle, the shellfish immobilizes these foreign matters to the shell with the same constituents as of the shell. By contrast, any foreign matters that have entered inside the mantle will be discharged. However, in the case where small chips of mantles with some foreign matters kept in contact therewith are transplanted to the interiors of the mantles of living shellfish, the small chips of mantles and the mantles of the living shellfish adhere to each other so as to form a bag of mantle, which is so called pearl bag, in which a pearl layer is formed on the outer peripheral surfaces of the foreign matters. As the shellfish capable of forming high quality pearl layers, well known are the pearl oyster among sea shellfish, and *Hyriopsis (Sinohyriopsis) schlegelii* among freshwater shellfish.

For production of cultured pearls, bivalves capable of forming quality pearls, such as pearl oyster, are cultured and, to these bivalves, small chips of mantles of above-mentioned other shellfish (mostly pearl oysters that have yielded pearls) with the cores kept in contact therewith are transplanted. The shellfish after the transplantation are cultured for another several years, and sufficiently grown pearls are gathered up.

For the cultured pearls, it is critical to transplant the small chips of mantles of other shellfish, with the cores kept in contact therewith, into the body of a pearl mother shellfish such as pearl oyster. This transplantation is a major operation for the pearl mother shellfish, requiring even those skilled in the art to be cautious in operation, where nevertheless the success rate is not so high. Besides, the core, which is a foreign matter for shellfish, presses the internal organs of the shellfish, so that too large a core may cause the mother shellfish to die even if the operation has succeeded. There is another need for the mother shellfish to be cultured for a long period. That is, the mother shellfish is cultured for about one year since the acquisition of immature shellfish, and subjected to the operation for core incorporation. After the core incorporation, although varying depending on the size of the core, it takes about three years to make pearls with diameter around 3 mm, and five to six years to make pearls with diameter around 5 mm. During the culture period, the mother shellfish needs to be fed with appropriate food in a sea of good environment. The occurrence of a red tide due to pollution of the sea, as can be seen recently, might cause the whole mother shellfish to be totally destroyed. Thus, there is a need for sufficient control during the pearl culture period.

SUMMARY OF THE INVENTION

Hence, an object of the present invention is to solve the foregoing issues and to provide a pearl of sufficiently large size, and a method for producing the same in a short time without requiring any skilled techniques.

The present invention provides a method for producing a pearl, and a pearl produced by the method, the method comprising:

depositing a pearl layer onto an outer peripheral surface of a core composed of a small chip of synthetic resin, shell, ceramic, wood, or metal, formed into any optional shape in a bath which contains seawater or freshwater containing an abundance of calcium ions, magnesium ions, or other metal ions, capable of forming a pearl layer, as well as anions such as carbonate ions, by organisms in which mantle genes of pearl forming shellfish have been incorporated in genes of monads, or ultramicro organisms that generate a viscous secretion.

According to the invention, genes are extracted from cell nuclei of pearl oysters or *Hyriopsis (Sinohyriopsis) schlegelii* mantles capable of forming high quality pearl layers. The genes are incorporated into the genes of monads, such as bacilli, colon bacilli or ultramicro organisms, such as viruses, which will generate a viscous secretion. These organisms (hereinafter referred to as "pearl generating organisms") are provided with sufficient nutrition so that they will propagate under an optimum environment. Calcium ions and magnesium ions, or other metal ions for forming a pearl layer, are sufficiently dissolved into a seawater or freshwater bath. Carbon dioxide is also dissolved into the water bath. Cores, composed of small chips of synthetic resin, shell, ceramics, wood, metal, or the like are placed in the seawater along with the pearl generating organisms propagated in the manner discussed above. The pearl generating organisms containing the incorporated genes function to combine the calcium ions, magnesium ions, and the like, in the seawater with carbonate ions, due to the dissolution of carbon dioxide, into a pearl layer by an action similar to the mantle of a pearl oyster.

Further, the viscous secretion, inherent in the pearl generating organisms, causes the pearl layer to adhere and stack onto the core, so that a pearl is formed.

In this method, unlike the conventional cultured pearls that would be cultured in shells, the formation of pearls can be carried out in a large place. Thus, the pearls are not limited in size. Moreover, their shape is no longer limited to spherical shapes, but rather may take the form of oval bodies, crosses, or Buddhist statues covered with a pearl layer.

Furthermore, the period in which pearls are formed can be reduced, depending on the number of pearl generating organisms. Therefore, given a good living environment and sufficient nutrition for the pearl generating organisms, the pearls can be formed in shorter periods of time.

The present invention also provides a method for producing a pearl, and a pearl produced by the method, the method comprising:

propagating organisms in which pearl forming mantle genes of shellfish have been incorporated into genes of monads, or ultramicro organisms, which generate a viscous secretion, in a first bath which contains seawater or freshwater containing an abundance of calcium ions, magnesium ions, or other metal ions, capable of forming a pearl layer, as anions such as carbonate ions;

depositing a pearl layer onto an outer peripheral surface of a core composed of a small chip of synthetic resin, shell, ceramic, wood, or metal formed into any optional shape;

concentrating the viscous secretion generated by the organisms and pearl constituents; and transferring the concentrated viscous secretion and pearl constituents to a second bath to control.

According to the invention, seawater, or freshwater, in which the metal ions and the carbon dioxide have been dissolved, is prepared in the first bath. The propagated pearl generating organisms are added to the water so that pearl constituents and viscous secretion are formed in the first bath. The pearl constituents and viscous secretion are concentrated and transferred to the second bath and a pearl layer is stacked on the outer peripheral surface of the core in the second bath. In this case, the concentration of pearl constituents and the viscous secretion are controlled so that pearl layers are formed on the outer peripheral surfaces of the cores. Since no pearl generating organisms are present in the second bath, high concentrations can be maintained so that the formation of pearls can be accelerated.

Further, the invention is characterized in that when the pearl layer is deposited onto the outer peripheral surface of the core in the second bath, electrical current is applied to the second bath. The small flow of current further accelerates the formation of pearls.

Accordingly, the pearls are formed in a large place by pearl generating organisms into which genes of mantles of pearl mother shellfish have been incorporated. Therefore, the pearls are not limited in size or shape. Moreover, providing the pearl generating organisms with a good living environment enables the pearls to be formed in shorter terms.

DETAILED DESCRIPTION OF THE PREFERRED EMBODIMENTS

Now the present invention is described in more detail by way of embodiments thereof.

EXAMPLE 1

A mantle of pearl oyster was prepared, and genes of its cell nuclei were extracted and incorporated into genes of colon bacilli. These colon bacilli were cultured with the prevention from invasion of miscellaneous germs, by which colon bacillus colonies were obtained. The culture solution, as in the case of culture solutions used for the common bacteria culture, is composed of agar and bouillon added thereto.

Sterilized seawater is prepared in a bath, and adjusted so as to contain 5 g of $Ca^{2+}$ and 10 g of $Mg^{2+}$ on the basis of 1000 g of seawater, into which carbon dioxide is blown. Meanwhile, each ten pieces of 8 mm in diameter balls and longitudinal 15 mm by lateral 10 mm crosses are made, and added into the seawater.

Colon bacillus colonies treated as described above are added into the seawater along with the culture solution, and kept at 35° C. Of the seawater, $Ca^{2+}$ and $Mg^{2+}$ are analyzed once a week or so, and carbon dioxide is blown into the seawater once a week, so that $Ca^{2+}$ becomes 5 g/l and $Mg^{2+}$ becomes 10 g/l. Also, as a nutrition source for the colon bacilli, bouillon is supplied. In this state, the seawater is retained for one year with the prevention from the invasion of miscellaneous germs. One year later, pearls having a diameter of about 10 mm and crosses covered with a pearl layer were obtained. Among these pearls, those having a uniform pearl layer on the surface, i.e. good at the so-called wrapping characteristic were four in number out of the spherical-shaped pearls, and two in number out of the cross-shaped pearls.

In addition, since the pearls produced have colon bacilli adhering to their surfaces, the pearls should be sufficiently washed with water, and completely sterilized by irradiation of ultraviolet rays.

EXAMPLE 2

In the same way as in Example 1, colon bacillus colonies into which genes of mantles of pearl oyster had been incorporated were obtained; seawater containing calcium ions and magnesium ions as well as carbon dioxide at the same concentrations as in Example 1 was prepared in a first bath, to which the colon bacillus colonies were added; and, in about one month, with the prevention from any invasion of miscellaneous germs, seawater containing pearl constituents and viscous secretion was obtained. Part of this seawater was concentrated by a centrifugal separator, and the concentrated solution was transferred to a second bath. Then, the same cores as in Example 1 were thrown into the concentrated solution.

To the residue liquid in the first bath, new seawater is added in a state free from any invasion of miscellaneous germs. Then, the concentrations of calcium ions, magnesium ions, and carbon dioxide are controlled, and bouillon is fed as a nutrition source. This operation was repeated every month, and the concentrated solution in the second bath was replaced with a new solution.

In this example, pearls having a diameter of about 10 mm and crosses covered with a pearl layer were obtained after about eight months. The degree of wrapping of the pearl layers was nearly equal to that of Example 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for producing a pearl comprising:

incorporating mantle genes of pearl forming shellfish into genes of monads or ultramicro organisms which generate a viscous secretion;

propagating said organisms in a bath which contains seawater or freshwater containing an abundance of calcium ions, magnesium ions, or other metal ions, capable forming a pearl layer, as well as anions such as carbonate ions; and depositing a pearl layer, by the organisms, onto outer peripheral surface of a core composed of a small chip of a synthetic resin, shell, ceramic, wood, or metal formed into any optional shape placed in said bath.

2. A method for producing a pearl comprising:

incorporating mantle genes of pearl forming shellfish into genes of monads or ultramicro organisms which generate a viscous secretion;

propagating said organisms in a first bath which contains seawater or freshwater containing an abundance of calcium ions, magnesium ions, or other metal ions capable of forming a pearl layer, as well as anions such as carbonate ions;

concentrating the viscous secretion and pearl constituents generated by the organisms in the first bath;

transferring the concentrated viscous secretions and pearl constituents to a second bath to control the concentration of the viscous secretion and pearl constituents; and depositing a pearl layer, by the organisms in the second bath, onto an outer peripheral surface of a core composed of a small chip of a synthetic resin, shell, ceramic, wood, or metal formed into any optional shape.

3. The method for producing a pearl of claim 2 in which an electrical current is applied to the second bath when the pearl layer is deposited onto the outer peripheral surface of the core.

4. A pearl produced by the method of claims 1, 2, or 3.

* * * * *